United States Patent [19]
Schlegel et al.

[11] Patent Number: 6,044,915
[45] Date of Patent: Apr. 4, 2000

[54] HITCH ROCKER FOR A WORK VEHICLE

[75] Inventors: Daniel K. Schlegel, Racine; Michael D. Morton, Salem, both of Wis.

[73] Assignee: Case Corporation, Racine, Wis.

[21] Appl. No.: 08/500,550

[22] Filed: Jul. 11, 1995

[51] Int. Cl.⁷ .................................................. A01B 59/043
[52] U.S. Cl. ............................................................ 172/439
[58] Field of Search ................................. 172/439, 450, 172/448

[56] References Cited

U.S. PATENT DOCUMENTS

| | | | |
|---|---|---|---|
| 2,724,313 | 11/1955 | Jennings | 172/439 X |
| 2,780,160 | 2/1957 | Harris . | |
| 3,310,123 | 3/1967 | Abbott | 172/450 |
| 3,399,733 | 9/1968 | North | 172/9 |
| 3,910,355 | 10/1975 | Elfes et al. | 172/450 |
| 3,994,347 | 11/1976 | Schowalter | 172/9 |
| 4,470,613 | 9/1984 | Sykes | 280/460 |
| 4,482,971 | 11/1984 | Blazek | 172/439 X |
| 4,519,623 | 5/1985 | Orthman | 172/439 |
| 4,862,971 | 9/1989 | Azzarello et al. | 172/450 |
| 4,899,831 | 2/1990 | Schillings et al. | 172/439 X |

FOREIGN PATENT DOCUMENTS

| | | | |
|---|---|---|---|
| 4264130 | 3/1968 | Germany | 172/439 |
| 2101807 | 10/1978 | Germany | 172/439 |

*Primary Examiner*—Christopher J. Novosad
*Attorney, Agent, or Firm*—Foley & Lardner

[57] ABSTRACT

A rocker for a work vehicle hitch includes a rockshaft and a pair of rocker arms coupled to the rockshaft at rocker arm bases. The rocker is designed to be mounted to the work vehicle by support brackets. Each rocker arm base includes a cavity for receiving a portion of a support bracket. A bearing assembly is located within each base for supporting the rocker on the support brackets for rotation about a rocker rotational axis. Each rocker arm includes an actuator support for coupling to an actuator and a lift link support. The actuator and lift link supports permit rotation of actuators and lift links to raise and lower implements coupled to the hitch. As the rocker is rotated about its axis, each rocker arm base and rocker arm move through respective planes of rotation. Each bearing lies substantially within the plane of rotation of the associated rocker arm base. This structure effectively transmits lifting forces back to the hitch support structure through the bearing with minimal bending stress to the rocker. The bearing assemblies include support sleeves centered within the rocker by tapered support surfaces and held in place by a tension member. This bearing structure permits quick and straightforward mounting of the rocker on the vehicle as well as simple removal for servicing. The rocker is preferably formed by casting using coring technology and a single core to define internal features of the rockshaft and rocker arms.

16 Claims, 4 Drawing Sheets

HITCH ROCKER FOR A WORK VEHICLE

BACKGROUND OF THE INVENTION

The present invention relates generally to hitches for work vehicles such as agricultural tractors. More particularly, the invention relates to an improved rocker for such hitches that greatly facilitates mounting, removing and servicing of the hitch and its components. The invention also relates to a method for making the improved rocker as well as to a structure for mounting the rocker onto a vehicle.

In the art of hitch assemblies for tractors and other work vehicles, a variety of structures have been proposed and are currently in use. Conventional hitch assemblies typically include a rocker assembly for raising and lowering an implement coupled to the hitch, one or more hydraulic cylinders connected to the rocker assembly and a pair of draft links for mounting and pulling an implement. Such hitches also commonly include a third or upper link that cooperates with the rocker assembly and draft links to maintain a desired orientation of the implement.

The rocker assembly of conventional tractor hitches typically includes a rockshaft splined to receive rocker arms as well as a bell crank or lever for rotating the rockshaft in response to extension and retraction of a hydraulic cylinder. The rockshaft is supported on journal bearings either inboard or outboard of the rocker arms. For rear-mounted hitches, the rockshaft journal bearings are typically provided in a massive support casting secured to the upper, rear or side surfaces of the differential housing. For raising and lowering the hitch either a single or a pair of lift cylinders may be provided. Where a single lift cylinder is used, the cylinder is generally located within the differential housing and cooperates with a central bell crank or lever splined to the rockshaft to force rotation of the shaft and thereby to raise and lower the rocker arms. Where two lift cylinders are present, the cylinders are typically external to the differential housing and are mounted on either side of the rear differential. In both cases the rocker arms are connected to the draft links via lift links, including turn buckles for adjusting the distance between the rocker arms and draft links, and are raised and lowered by rotation of the rockshaft and rocker arms. Hitch assemblies generally of this type are described in U.S. Pat. No. 2,780,160, issued to Harris on Feb. 5, 1957; U.S. Pat. No. 3,310,123, issued to Abbott on Mar. 21, 1967; U.S. Pat. No. 4,470,613, issued to Sykes on Sept. 11, 1984; and U.S. Pat. No. 4,482,971, issued to Azzarello et al. on Sep. 5, 1989.

While such hitch assemblies have become generally reliable and useful tools for positioning implements carried by work vehicles, they are not without drawbacks, many of which stem from the structure of their rocker assemblies. For example, because the rockshaft and rocker arms are assembled as a unit, typically after the rockshaft is mounted in its support bearings, servicing of the bearings or assembly requires a time consuming process of dismantling and rebuilding the entire rocker assembly. Similarly, in hitches using a central bell crank and cylinder to rotate the rocker assembly, servicing of the cylinder requires partial dismantling of the differential as well as the rocker assembly. Moreover, because the rockshaft is generally supported by journal bearings inboard or outboard of the splines to which the rocker arms are attached, the rockshaft is subjected to considerable bending stresses, particularly when heavy implements are lifted on the hitch. This is particularly true for designs employing a central bell crank for rotating the rockshaft. However, even in hitches utilizing a pair of external lift cylinders coupled to the rocker arms, such stresses are high and can be increased by any misalignment between the rotational axis where each cylinder clevis joins the respective rocker arm and the rotational axis of the rockshaft.

There is a need therefore for an improved hitch rocker that is both rugged and relatively easy to mount and remove from the hitch assembly. In addition, there is a need for a hitch rocker that reduces the bending stresses in the rockshaft, while avoiding axis misalignment of the type tending to augment such stresses.

SUMMARY OF THE INVENTION

The invention features a novel hitch rocker for work vehicles, such as agricultural tractors, designed to respond to these needs. The rocker is preferably made as a single-piece that can be mounted on rocker supports in the hitch assembly by simply lowering the rocker into place and inserting pin assemblies to support the rocker bearings. Removal and replacement of the rocker is thus greatly simplified and does not require removal of rocker arms from a rockshaft as in conventional designs. The preferred embodiment also incorporates bearing support axes lying generally in the same plane as actuator support axes, effectively reducing or eliminating the source of bending stresses in conventional designs due to placement of bearings inboard or outboard of the rocker arm attachment points. Moreover, the rocker is preferably a cast structure made using coring technology to define the rotational axes of the rocker and the actuator support surfaces, reducing or eliminating another source of stress due to misalignment between these axes.

Thus, in accordance with a first aspect of the invention, a hitch rocker for a work vehicle such as an agricultural tractor includes a rockshaft, a pair of rocker arms and a pair of bearings. Each rocker arm has a base coupled to the rockshaft and rotatable in a plane of rotation, and an actuator support for coupling an actuator to the rocker arm. The bearings rotatably support the rockshaft and the rocker arms about a rocker rotational axis. Each bearing lies substantially in the plane of rotation of a respective rocker arm base.

In accordance with another aspect of the invention, a hitch rocker includes a tubular rockshaft, a pair of rocker arms and a pair of bearings. The rocker arms are coupled to the rockshaft and are rotatable about an axis of rotation with the rockshaft. Each rocker arm includes a pair of bearing supports. The bearings support the rockshaft and the rocker arms for rotation about the axis of rotation and each bearing is disposed between the bearing supports of a respective rocker arm.

In accordance with a further aspect of the invention, a hitch rocker includes a rockshaft, first and second rocker arms and bearing support surfaces. The rocker arms are coupled to the rockshaft and are rotatable with the rockshaft about a first axis. The rocker arms rotate in first and second rotational planes respectively. Each rocker arm includes an actuator support substantially in the rotational plane of the rocker arm for coupling the rocker arm to an actuator rotatable about a second axis. The bearing support surfaces are provided for supporting bearings for mounting the rocker on the vehicle and are disposed to maintain a bearing substantially in the rotational plane of each rocker arm.

In accordance with another aspect of the invention, a method is provided for manufacturing a hitch rocker of the type including a rockshaft and first and second rocker arms coupled to the rockshaft. Each rocker arm includes a first support surface defining a first rotational axis and a second support surface defining a second rotational axis. The first support surfaces are configured to support the rocker rotatably about the first axis and each second support surface is configured to receive an actuator rotatably about the second axis. The method includes the steps of providing a core defining at least the first and second support surfaces of the first rocker arm, casting the rocker around the core and removing the core from the rocker to form the first and second support surfaces of at least the first rocker arm. In a particularly preferred embodiment, the core defines the first and second support surfaces of both the first and second rocker arms, allowing parallelism between the first and second axes to be controlled via the core.

In accordance with yet another aspect of the invention, a method for manufacturing a hitch rocker is provided. The rocker is of the type including a rockshaft, a pair of rocker arms coupled to the rockshaft and first and second support surfaces for supporting the rockshaft and rocker arms on the vehicle rotatably about a rotational axis. The method includes the steps of providing a single core defining the first and second support surfaces, casting the rocker around the core and removing the core from the rocker to form the first and second support surfaces. The rockshaft is preferably hollow and the core also defines internal features of the rocker, such as surfaces for supporting bearings within the rocker.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
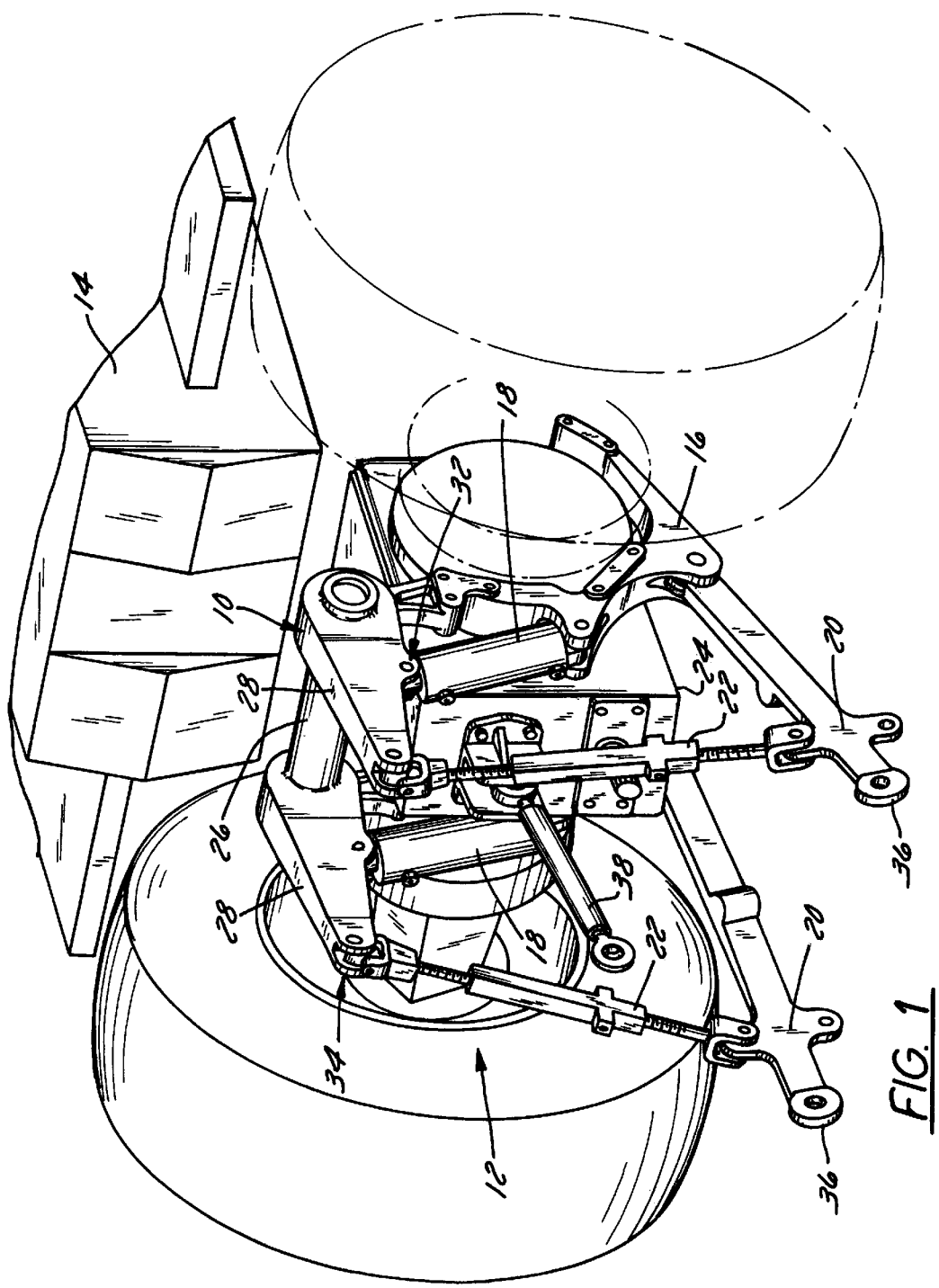
FIG. 1 is a perspective view of a hitch assembly incorporating an exemplary embodiment of a rocker in accordance with the invention shown mounted to the rear differential housing of a tractor.

Turning now to the drawings and referring to FIG. 1, an exemplary rocker 10 is illustrated as it would be incorporated in a hitch assembly 12 for raising and lowering an implement (not shown) on a work vehicle 14 such as an agricultural tractor. As shown in FIG. 1, hitch assembly 12 typically includes mounting brackets 16 for securing assembly 12 to vehicle 14, a pair of actuators 18, a pair of draft links 20 coupled to brackets 16 for lifting and pulling an implement, and a pair of lift links 22 coupled between draft links 20 and rocker 10. While hitch assembly 12 is illustrated mounted to the rear differential housing 24 of vehicle 14, it should be understood that rocker 10 as described in detail below may be incorporated into hitch assemblies of different overall construction or adapted for mounting on another portion of vehicle 14, such as on a front portion of the vehicle or on other support structures on the rear of the vehicle.

Figure 2:
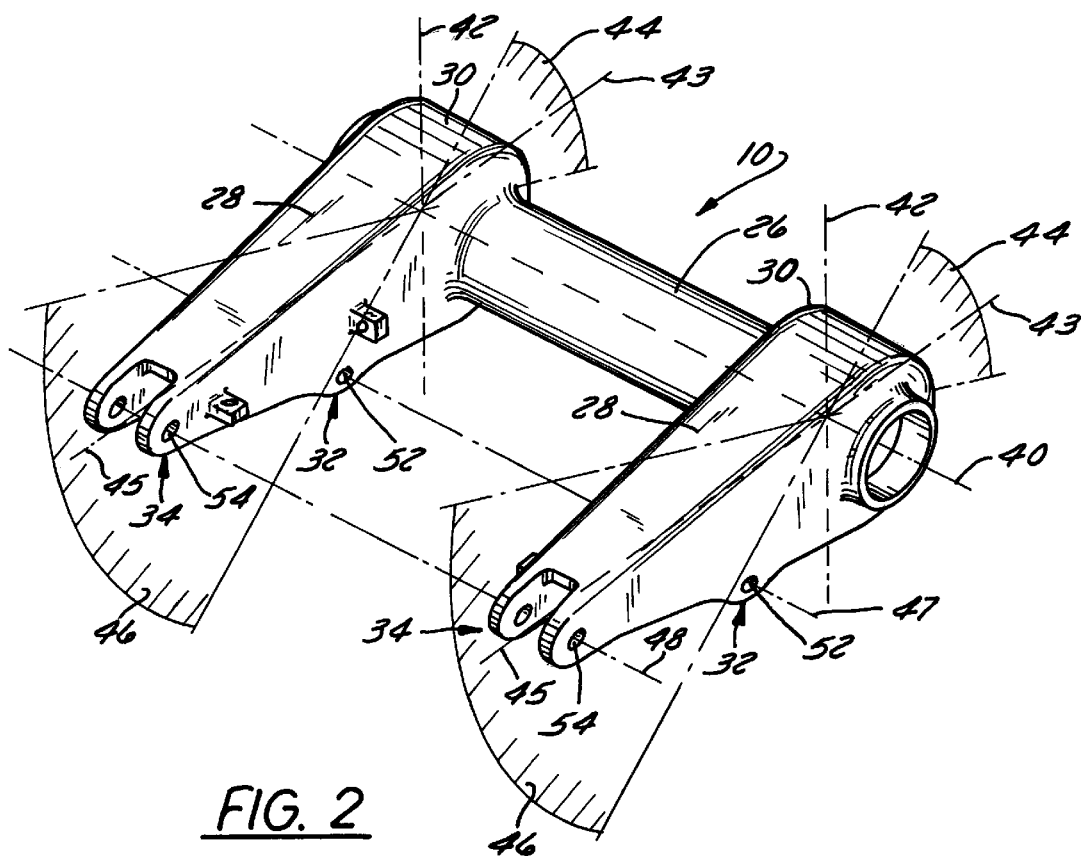
FIG. 2 is a top perspective view of the rocker illustrated in FIG. 1, showing the rotational axes of the rocker, the actuator supports and the lift link supports as well as the rotational planes of the rocker arms in accordance with a preferred embodiment of the invention.

As best illustrated in FIGS. 1 and 2, hitch rocker 10 includes a rockshaft 26 and a pair of rocker arms 28, each coupled to the rockshaft at a rocker arm base, generally designated by the reference numeral 30. Each rocker arm 28 includes an actuator support 32 and a lift link support 34 for coupling the rocker arm to a respective actuator 18 and lift link 22. Upon installation of hitch assembly 12, actuators 18 are fluid coupled to a hydraulic circuit (not shown) of generally conventional design, including valving for selectively extending and retracting actuators 18 to cause pivotal movement of rocker 10. In operation, actuator supports 32 accept forces exerted by actuators 18 while permitting pivotal movement of actuators 18 with respect to rocker arms 28. Lift link supports 34 transmit lifting forces from rocker arms 28 to lift links 22 to raise and lower lift links 22, thereby raising and lowering ends 36 of draft links 20 and any implement coupled to draft links 20. In addition to these elements, hitch assembly 12 may include a third or upper link 38, typically rigidly mounted to vehicle 14, which may be of fixed or variable length. Upper link 38 facilitates complete lifting of implements coupled to hitch assembly 12 as well as angular adjustments for such implements in a manner well known in the art.

Figure 3:
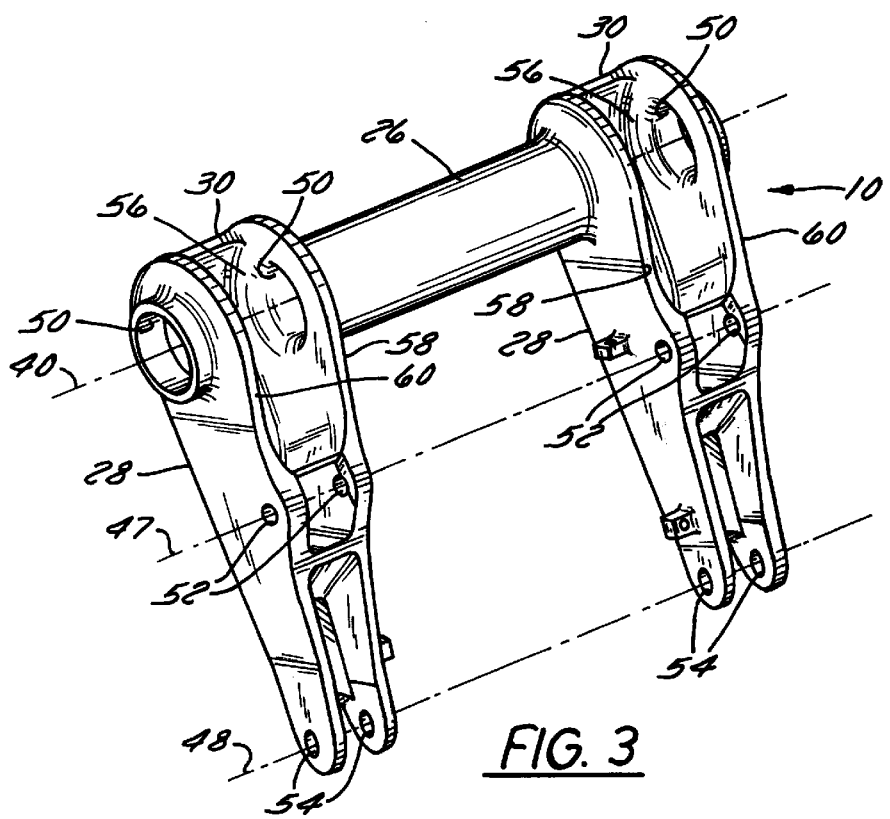
FIG. 3 is a bottom perspective view of the rocker illustrated in FIG. 2, showing a preferred structure of the rocker arms.

Referring more specifically to the structure of rocker 10, as illustrated in FIGS. 2 and 3, rocker arms 28 are preferably permanently coupled to rockshaft 26. In a particularly preferred method for manufacturing rocker 10 described below, rockshaft 26 and rocker arms 28 are cast as a single piece structure using coring technology to form certain key features of rocker 10. Rocker 10 is configured for mounting on brackets 16 for rotation about a rotational axis 40, generally along the longitudinal centerline of rockshaft 26. Rotational axis 40 passes through the base 30 of each rocker arm 28 and intersects, within each base 30, a transverse axis 42 of base 30. A longitudinal axis 43 of each base 30 intersects the respective transverse axis 42 of the base as well as rotational axis 40 generally at the center of a bearing arrangement described in greater detail below. Each pair of transverse and longitudinal axes 42, 43 for each base 30 together define a plane of rotation 44 of the base 30 about rotational axis 40. Thus, as rocker 10 is rotated about axis 40 in response to extension and retraction of actuators 18, each rocker arm base 30 rotates generally in its plane of rotation 44.

Departing from rocker arm bases 30, rocker arms 28 extend from rockshaft 26 along longitudinal axes 45. In the preferred embodiment illustrated, rocker arms 28 extend from rockshaft 26 generally perpendicularly with respect to rotational axis 40 and longitudinal axes 45 of rocker arms 28 are coincident with longitudinal axes 43 of their respective bases 30. However, axes 43 and 45 for each rocker arm base and rocker arm may be disposed at an angle with respect to one another such that rocker arms 28 extend at an angle other than 90 degrees with respect to rotational axis 40. In either case, each rocker arm 28 extends generally from the transverse axis 42 of its base 30 and traces a rotational plane 46 as it is rotated about rotational axis 40. In the preferred embodiment illustrated, because longitudinal axes 43 and 45 of each base 30 and rocker arm 28 are coincident, the rotational planes 44 and 46 of the base and rocker arm lie within a common plane.

In addition to rotational axis 40, rocker 10 includes an actuator rotational axis 47 traversing actuator supports 32. An end of each actuator 18 coupled to actuator supports 32 rotates about axis 47 as the actuator is extended and retracted to pivot rocker 10. A similar lift link rotational axis 48 traverses lift link supports 34 to permit rotation of an upper end of each lift link 22 coupled to rocker arms 28.

Figure 4:
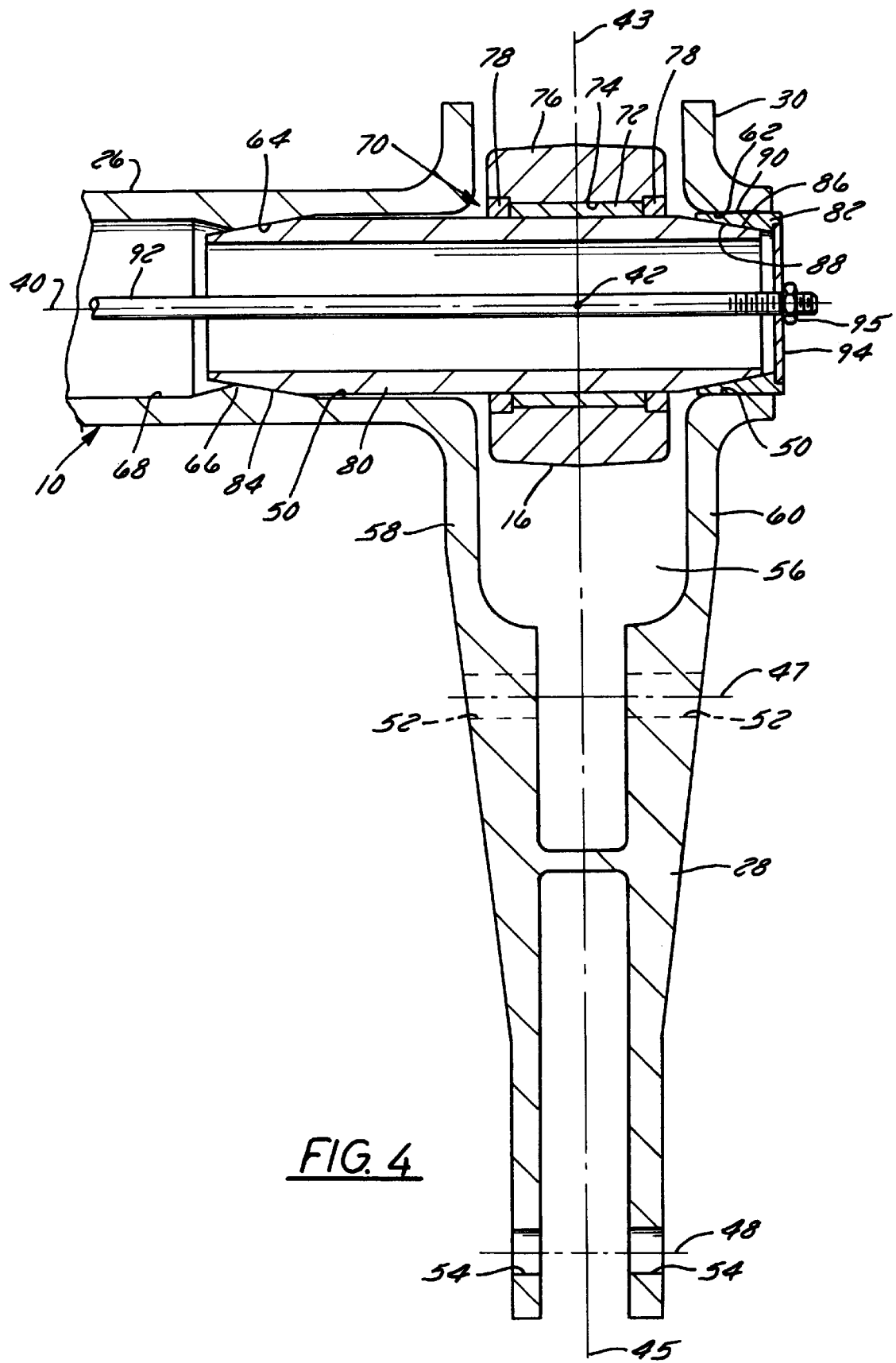
FIG. 4 is a sectional view of the rocker of FIG. 3 along section 44 showing a preferred bearing arrangement for maintaining the rocker rotationally on a mounting bracket supported on the work vehicle.

The orientations of rotational axes 40, 47 and 48 are defined by support surfaces within each support structure as shown in FIGS. 2 and 3. Thus, bearing supports 50, described in greater detail below with respect to FIG. 4, are provided in rocker arm bases 30 for receiving and supporting bearing arrangements within rocker 10 to transmit loads on rocker 10 to mounting brackets 16 and thereby to vehicle 14. Similarly, actuator support surfaces 52 define actuator rotational axis 47 and transmit forces from actuators 18 to rocker arms 28; while lift link support surfaces 54 define lift link rotational axis 48 and transmit forces from lift links 22 to rocker arms 28. In the preferred embodiment illustrated in the FIGURES, actuator rotational axis 47 is substantially parallel to rotational axis 40 of rocker 10. This parallelism between the rotational axes tends to reduce stresses on rocker arms 28, bearing supports 50 and actuator support surfaces 52 as actuators 18 force rocker 10 to rotate, particularly when hitch assembly 12 is heavily loaded. Moreover, lift link rotational axis 48 is also preferably parallel to rotational axis 40 to similarly reduce stresses on the lift links and lift link support surfaces 54 during pivotal movement of rocker 10.

As best illustrated in FIG. 3, each rocker arm 28 preferably comprises an open, hollow structure surrounding a cavity 56 generally in its base 30 and extending to the actuator support 32. Cavity 56 is bounded laterally by side flanges 58 and 60 forming the inner and outer sides respectively of each rocker arm 28. Bearing supports 50 are formed in side flanges 58 and 60 along rotational axis 40. Actuator support surfaces 52 generally comprise inner surfaces of apertures in flanges 58 and 60 at about a midpoint along rocker arms 28, while lift link support surfaces 54 comprise similar inner surfaces of apertures near a distal end of each rocker arm 28. Actuators 18 and lift links 22 are coupled to rocker 10 by inserting a tab or clevis end (not shown), of conventional design, between flanges 58 and 60, aligning a pin aperture on the tab end with support surfaces 52 and 54 respectively, and inserting a retaining or clevis pin (not shown) through the aligned apertures.

As shown in FIGS. 3 and 4, rockshaft 26 is preferably a hollow, tubular structure extending between rocker arm bases 30, the interior of rockshaft 26 being in communication with cavities 56. Bearings are provided within each base 30 and supported by bearing supports 50. A preferred bearing arrangement for pivotally supporting rocker 10 on vehicle 14 is shown in FIG. 4. Bearing supports 50 adjacent to each rocker arm base 30 include an outer bearing support surface 62 and a tapered, centering bearing support surface 64 situated slightly within rockshaft 26. While outer bearing support surface 62 is generally straight cylindrical in form, centering bearing support surface 64 is comprises an inclined face of an annular boss 66 extending from an inner wall 68 of rockshaft 26.

A bearing assembly 70 is positioned between bearing support surfaces 62 and 64 along transverse and longitudinal axes 42 and 43 of each rocker arm base 30. Each bearing assembly 70 includes a journal 72 fitted within an aperture 74 in an upper end 76 of mounting bracket 16, a pair of seals 78 on either side of journal 72, a support sleeve 80 and a locking member 82. Support sleeve 80 is a hardened, hollow metal sleeve having tapered ends 84 and 86. When installed as illustrated in FIG. 4, tapered end 84 of support sleeve 80 bears against centering support surface 64 and is centered by surface 64 along rotational axis 40, while tapered end 86 of support sleeve 80 bears against locking member 82. Locking member 82 is preferably a tapered split ring having a wedge-shaped cross section formed by an inclined surface 88 and a straight cylindrical surface 90. When installed in bearing assembly 70, locking member 82 engages tapered end 86 of support sleeve 80 and is wedged between the support sleeve and outer bearing support surface 62, again centering support sleeve 80 along rotational axis 40. To facilitate assembly of bearing assembly 70, tapered ends 82 and 84 may be substantially identical and support sleeve 80 may be symmetrical so as to permit installation of sleeve 80 with either tapered surface contacting centering support surface 64 and locking member 82.

A tension member 92 passes through rockshaft 26 and bearing assemblies 70 within each rocker arm base 30 to maintain bearing assemblies tightly engaged within rocker 10. Tension member 92 passes through an annular retaining plate 94 positioned outboard of each locking member 82 on either side of rocker 10 to press locking members 82 into tight, wedged engagement between outer support surface 62 and sleeves 80 as tension member 92 is secured in place. In the presently preferred embodiment, tension member 92 is a high tensile strength rod having threaded ends for receiving nuts 95 (one only shown) for tightening bearing assemblies 70 within rocker 10 as it is mounted onto brackets 16.

The preferred internal structures of rocker 10 and bearing assemblies 70 as described above greatly facilitate mounting, dismantling and servicing rocker 10 and bearing assemblies 70 as compared with known hitch rocker structures. To mount rocker 10 in hitch assembly 12, rocker 10 is first lowered into place over brackets 16 with the upper end 76 of each bracket penetrating into cavity 56 in each rocker arm base 30. A support sleeve 80 is then inserted through each bearing support 50, through seals 78 and journal 72 within bracket 16 and into loose abutment with centering support surface 64. Next, locking members 82 are pressed loosely into place between each sleeve 80 and outer bearing support surface 62. Tension member 92 is then inserted through rockshaft 26 and bases 30 with retaining plates 94 on either end thereof and nuts 95, or similar tightening fasteners, are tightened on tension member 92 to bring the entire structure into tight, centered engagement. Actuators 18 and lift links 22 may then be connected to rocker arms 28. Dismantling of the structure follows the reverse procedure, beginning by withdrawal of tension member 92 and locking members 82, followed by removal of support sleeves 80.

It should also be noted that the preferred structure described above affords considerable advantages over known hitch rocker designs with respect to transmission and orientation of forces encountered by the rocker during use. For example, because bearing assemblies 70 lie generally within the rotational planes 43 of rocker arm bases 30, rather than inboard or outboard of bases 30 as in conventional designs, forces on rockshaft 26 and rocker arms 28 are transmitted to brackets 16 with minimimum bending stresses being transmitted to rockshaft 26. Moreover, by disposing bearing assemblies 70 within cavity 56 generally between flanges 58 and 60, mounting of rocker 10 is simplified and forces on rocker arms 28 are evenly transmitted to bearing assemblies 70 through support surfaces 62 and 64, and sleeves 80. Furthermore, in the preferred embodiment illustrated, in which rocker arm longitudinal axes 45 and base axes 43 are coincident and bearing assemblies 70 lie along the same axes, forces on actuator supports 32 are transmitted back to bearing assemblies 70 with minimal bending stresses on rocker arms 28.

In addition to these functional advantages, the structure described above lends itself to manufacturing techniques offering distinct advantages over conventional techniques for constructing hitch rocker assemblies. Such known techniques typically include separate manufacturing of a rockshaft and rocker arms followed by assembly of these elements into a finished rocker assembly. The rockshaft is typically machined from barstock and splined to accept the rocker arms. Rocker arms are typically cast and machined to accept internal spine bushings and to form actuator and lift link support surfaces. Throughout these processes, fixturing must ensure proper tolerances and parallelism between the various axes and mating surfaces.

Rocker 10, on the other hand may be cast as a single piece using coring to form the surfaces and features described above. In the presently preferred method for manufacturing rocker 10, one or more cores are made as discussed below, the cores are supported within a mold and rocker 10 is cast. The cores are then removed to define the desired internal features of rocker 10. As will be apparent to those skilled in the art, due to the size and strength requirements of rocker 10, the casting process employed will typically be sand casting and rocker 10 will comprise an iron or iron alloy. Moreover, smoothness and dimensional tolerances on the core or cores used to define the features of rocker 10, particularly support surfaces 62, 64 and 52, are preferably sufficiently controlled to require little or no machining of the rocker other than routine cleaning of the finished casting.

Figure 5:
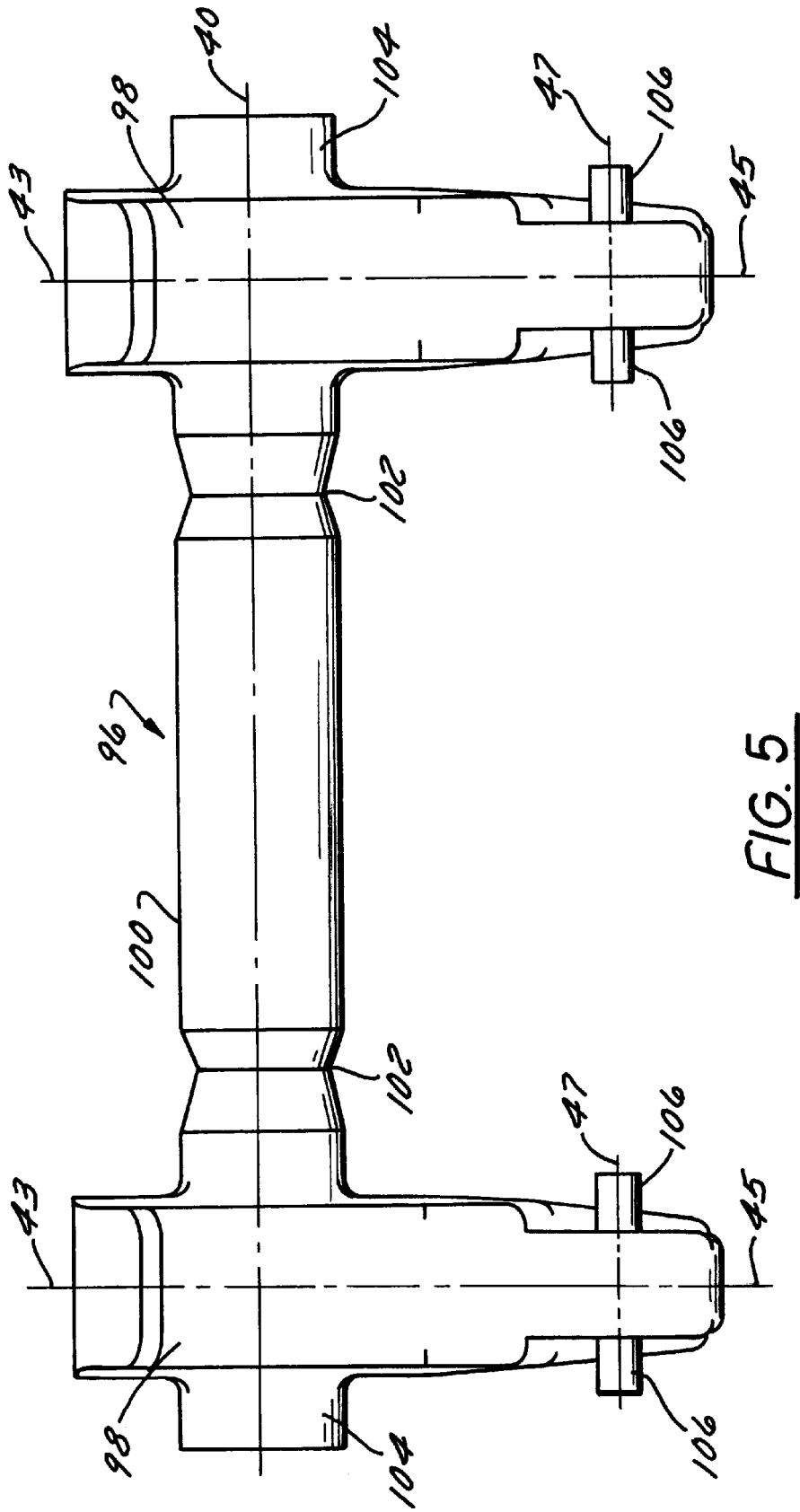
FIG. 5 is a perspective view of an exemplary core used to form certain of the internal features of the rocker of FIG. 1 in accordance with a preferred method for making the rocker.

Cavity 56 within each rocker arm base 30, bearing support surfaces 62 and 64, and actuator support surfaces 52 are preferably formed by a single core as illustrated in FIG. 5. As shown in FIG. 5, the core 96 may be constructed in accordance with conventional techniques and is preferably a coated dry-sand core having end regions 98 defining the internal contour of cavities 56, joined by a central region 100 defining the internal surface 68 of rockshaft 26. End regions 98 and central region 100 are formed about rotational axis 40. End regions 98 also define the longitudinal axis 43 of each rocker arm base 30, as well as longitudinal axis 45 of each rocker arm 28. Along central region 100, annular recesses or grooves 102 adjacent to end regions 98 define annular bosses 66, including support surfaces 64. Outwardly from end regions 98, extensions 104 define outer support surfaces 62, and open cavities 56 defined by end regions 98 for installation of bearing assemblies 70 as described above. Lateral extensions 106 are provided on end portions 98 to define the internal surfaces 52 of actuator supports 32 along actuator rotational axis 47. It will be appreciated that, because these features of core 96 are predefined upon production of the core, parallelism between rotational axes 40 and 47 may be easily maintained in rocker 10, even should core 96 drift slightly during casting. Moreover, the use of a single core 96 assures that features formed about axis 40 will be properly aligned in the finished rocker 10.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, while the method for manufacturing rocker 10 involves the use of a single core 96, several separate cores may be used to obtain certain of the advantages of the core described above. In particular, two mirror image cores may be formed, in effect dividing core 96 in the middle of central region 100, to define identical cavities 56 and support surfaces 62, 64 and 52 for each rocker arm 28. Such cores would meet within rockshaft 26 to ensure an internal opening sufficient to permit passage of tension member 92. Such cores ensure parallelism between rotational axes 40 and 47 for each rocker arm 28, although they may require alignment to assure concentricity of features along the length of axis 40.

We claim:

1. A hitch rocker for a work vehicle comprising:

a rockshaft;

a pair of rocker arms, each rocker arm having a base coupled to the rockshaft and rotatable in a plane of rotation, each rocker arm further including an actuator support for coupling an actuator to the rocker arm; and a pair of bearings rotatably supporting the rockshaft and rocker arms about a rocker rotational axis, each bearing lying substantially in the plane of rotation of a respective rocker arm base, the plane of rotation of each rocker arm base being substantially perpendicular to the rocker rotational axis.

2. The hitch rocker of claim 1, wherein each rocker arm extends substantially within the plane of rotation of the respective rocker arm base.

3. The hitch rocker of claim 1, wherein each rocker arm includes a lift link support lying in the plane of rotation of the respective rocker arm base.

4. The hitch rocker of claim 1, wherein the rockshaft and the rocker arms comprise a single-piece structure.

5. The hitch rocker of claim 4, wherein the rockshaft is hollow.

6. The hitch rocker of claim 1, wherein the rockshaft and the rocker arms comprise a single-piece casting.

7. The hitch rocker of claim 1, wherein each actuator support lies substantially in the plane of rotation of the respective rocker arm base.

8. The hitch rocker of claim 1, wherein each actuator support has an actuator pivot axis substantially parallel to the rocker rotational axis.

9. A hitch rocker for a work vehicle comprising:

a rockshaft rotatable about a first axis;

first and second rocker arms coupled to the rockshaft and rotatable with the rockshaft about a first axis in first and second rotational planes respectively, each rocker arm including an actuator support substantially in the rotational plane of the rocker arm for coupling the rocker arm to an actuator rotatably about a second axis, the first and second rotational planes being substantially perpendicular to the first and second axis; and bearing support surfaces for supporting a pair of bearings for mounting the rocker on the vehicle, the bearing support surfaces being disposed to maintain a bearing substantially in the rotational plane of each rocker arm.

10. The hitch rocker of claim 9, wherein each rocker arm includes a lift link support lying substantially in the rotational plane of the rocker arm.

11. A hitch rocker for a work vehicle such as an agricultural tractor comprising:

a rockshaft;

a pair of rocker arms coupled to the rockshaft and rotatable about an axis of rotation with the rockshaft, each rocker arm including a pair of bearing supports; and a pair of bearings supporting the rockshaft and rocker arms for rotation about the axis of rotation, each bearing being disposed between the bearing supports of a respective rocker arm.

12. The hitch rocker of claim 11, wherein each rocker arm includes a portion configured to receive a mounting bracket for mounting the rocker on the vehicle.

13. The hitch rocker of claim 11, wherein each bearing support includes an internal centering surface adjacent to each rocker arm, and wherein each bearing includes a support sleeve positioned within the rocker in contact with the centering surface and a journal positioned between the support sleeve and a mounting bracket for mounting rotatably on the vehicle.

14. The hitch rocker of claim 13, further comprising a tension member traversing the rockshaft and the support sleeves substantially along the axis of rotation and a pair of locking members adjacent to ends of the tension member, the tension member and the locking members cooperating with the support sleeves and the centering surfaces to maintain the bearings in an operative position within the rocker.

15. The hitch rocker of claim 11, wherein the rockshaft and the rocker arms comprise a single-piece structure.

16. The hitch rocker of claim 11, wherein the rockshaft and the rocker arms comprise a single-piece casting.

* * * * *